United States Patent
Takamatsu et al.

(10) Patent No.: US 10,259,324 B2
(45) Date of Patent: Apr. 16, 2019

(54) IN-VEHICLE DISPLAY APPARATUS AND INSTRUMENT PANEL

(71) Applicant: YAZAKI CORPORATION, Tokyo (JP)

(72) Inventors: Masahiro Takamatsu, Makinohara (JP); Tai Inoue, Makinohara (JP); Masahide Nagata, Makinohara (JP); Takayuki Ogawa, Makinohara (JP); Gosei Sato, Makinohara (JP); Takao Kanai, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/852,766

(22) Filed: Sep. 14, 2015

(65) Prior Publication Data

US 2016/0075235 A1 Mar. 17, 2016

(30) Foreign Application Priority Data

Sep. 12, 2014 (JP) .................. 2014-186972
Sep. 12, 2014 (JP) .................. 2014-186984

(51) Int. Cl.
*B60Q 1/00* (2006.01)
*B60K 35/00* (2006.01)

(52) U.S. Cl.
CPC ...... *B60K 35/00* (2013.01); *B60K 2350/1096* (2013.01); *B60K 2350/962* (2013.01)

(58) Field of Classification Search
CPC .............................. B60R 1/00; B60R 2225/00
See application file for complete search history.

(56) References Cited

U.S. PATENT DOCUMENTS

| | | | |
|---|---|---|---|
| 6,715,885 B2 | 4/2004 | Hirose et al. | |
| 8,947,454 B2 | 2/2015 | Hashikawa et al. | |
| 2002/0039229 A1 | 4/2002 | Hirose et al. | |
| 2003/0109322 A1* | 6/2003 | Funk | A63B 24/0003 473/222 |
| 2004/0102223 A1* | 5/2004 | Lo | G09F 9/33 455/566 |
| 2005/0030256 A1 | 2/2005 | Tubidis et al. | |
| 2007/0001830 A1* | 1/2007 | Dagci | B60K 31/185 340/438 |

(Continued)

FOREIGN PATENT DOCUMENTS

| | | |
|---|---|---|
| DE | 10061190 A1 | 6/2002 |
| DE | 102004031334 A1 | 1/2006 |

(Continued)

OTHER PUBLICATIONS

Office Action dated Oct. 25, 2016 by the Japanese Patent Office in counterpart Japanese Application No. 2014-186972.

(Continued)

*Primary Examiner* — Shirley Lu
(74) *Attorney, Agent, or Firm* — Sughrue Mion, PLLC

(57) ABSTRACT

A display unit incorporated in the housing surface of an instrument panel on the passenger seat side changes its display variously together with other display devices such as a liquid crystal display and a line illumination, and displays information such as driving information, danger notification information and entertainment information in coordination.

18 Claims, 12 Drawing Sheets

(56) References Cited

U.S. PATENT DOCUMENTS

| | | | |
|---|---|---|---|
| 2007/0061068 A1 | 3/2007 | Okamoto et al. | |
| 2008/0100561 A1* | 5/2008 | Price | C09K 9/02 345/102 |
| 2008/0150709 A1* | 6/2008 | Yamamoto | B60K 35/00 340/441 |
| 2008/0211652 A1* | 9/2008 | Cope | B60K 35/00 340/461 |
| 2008/0211779 A1* | 9/2008 | Pryor | G01C 21/3664 345/173 |
| 2009/0058845 A1* | 3/2009 | Fukuda | B60K 35/00 345/214 |
| 2009/0135089 A1* | 5/2009 | Konishi | B60K 35/00 345/1.3 |
| 2009/0229955 A1* | 9/2009 | Hein | H01H 3/12 200/42.01 |
| 2009/0273563 A1* | 11/2009 | Pryor | B60K 35/00 345/157 |
| 2010/0217477 A1* | 8/2010 | Brody | B60K 31/18 701/31.4 |
| 2012/0025967 A1* | 2/2012 | Staffanou | B60K 37/02 340/441 |
| 2012/0191342 A1* | 7/2012 | Kang | G01C 21/365 701/423 |
| 2012/0218295 A1* | 8/2012 | Hashikawa | B60K 35/00 345/629 |
| 2013/0144482 A1* | 6/2013 | Tuukkanen | G06F 3/0482 701/29.6 |
| 2013/0278001 A1* | 10/2013 | Zimmerman | B60R 13/0206 296/1.08 |
| 2014/0018974 A1* | 1/2014 | Okita | B60W 30/20 701/1 |
| 2014/0354045 A1* | 12/2014 | Snider | B60K 35/00 307/10.1 |
| 2014/0374704 A1* | 12/2014 | Jang | H01L 51/0097 257/40 |
| 2015/0001483 A1* | 1/2015 | Namkung | H01L 27/3244 257/40 |
| 2016/0046229 A1* | 2/2016 | Armenta Lopez | B60Q 1/00 340/441 |

FOREIGN PATENT DOCUMENTS

| | | |
|---|---|---|
| DE | 102012005853 A1 | 9/2013 |
| EP | 2181881 A1 | 5/2010 |
| JP | 162131 U | 4/1989 |
| JP | 06029097 Y | 8/1994 |
| JP | 2002104024 A | 4/2002 |
| JP | 2005-501769 A | 1/2005 |
| JP | 2005112251 A | 4/2005 |
| JP | 200722443 A | 2/2007 |
| JP | 200776382 A | 3/2007 |
| JP | 2007187912 A | 7/2007 |
| JP | 20081120 A | 1/2008 |
| JP | 2008290685 A | 12/2008 |
| JP | 2009-103843 A | 5/2009 |
| JP | 2009208680 A | 9/2009 |
| JP | 2012210901 A | 11/2012 |
| JP | 2013-78969 A | 5/2013 |
| JP | 2013-241038 A | 12/2013 |
| WO | 2008092598 A1 | 8/2008 |
| WO | 2011055699 A1 | 5/2011 |

OTHER PUBLICATIONS

Office Action dated Oct. 25, 2016, by the Japanese Patent Office in counterpart Japanese Application No. 2014-186984.

Communication dated May 16, 2017, issued by the Japanese Patent Office in counterpart Japanese application No. 2014-186972.

Communication dated May 16, 2017, issued by the Japanese Patent Office in counterpart Japanese application No. 2014-186984.

Office Action dated Dec. 2, 2016 issued by the German Patent Office in counterpart German Patent Application No. 102015217391.7.

Decision to Decline the Amendment issued by the Japanese Patent Office dated Dec. 12, 2017 in counterpart Japanese Patent Application No. 2014-186972.

Office Action issued by the Japanese Patent Office dated Dec. 12, 2017 in counterpart Japanese Patent Application No. 2014-186972.

* cited by examiner

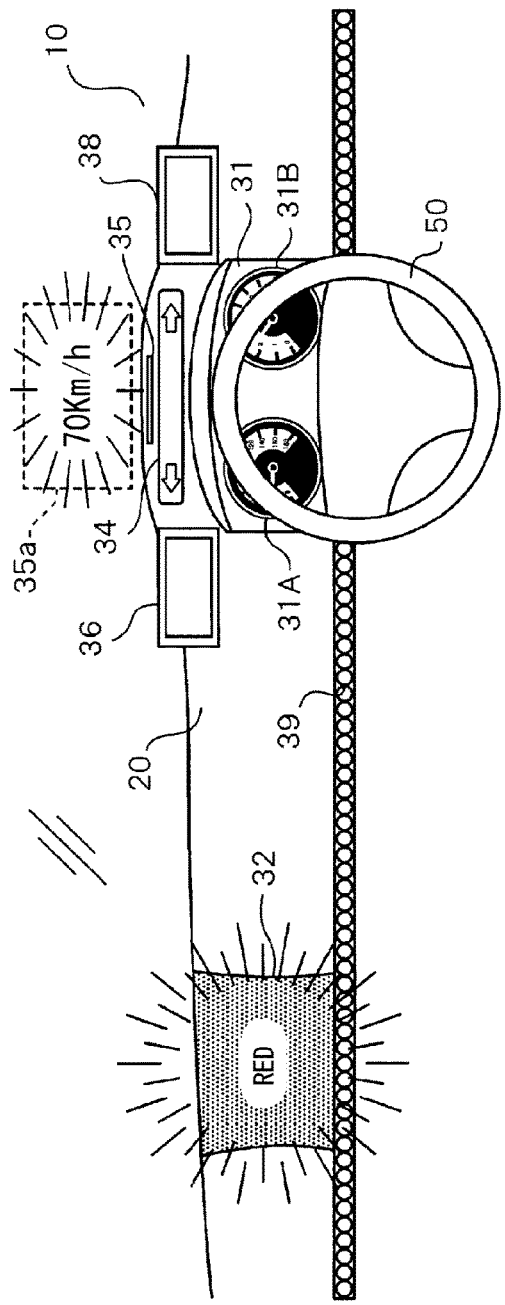
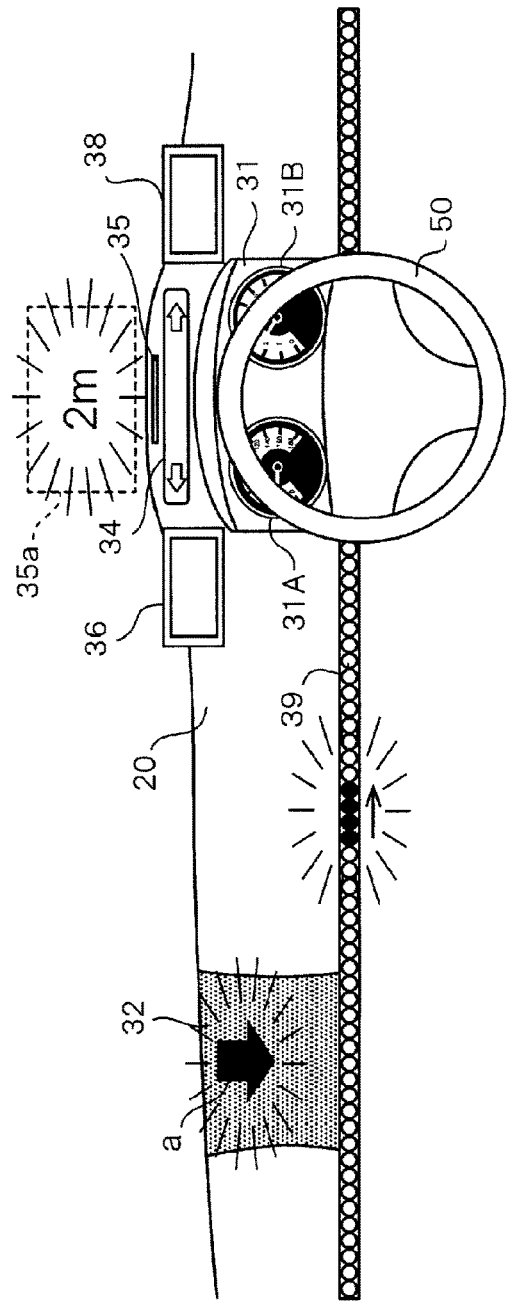
FIG. 6A
FIG. 6B

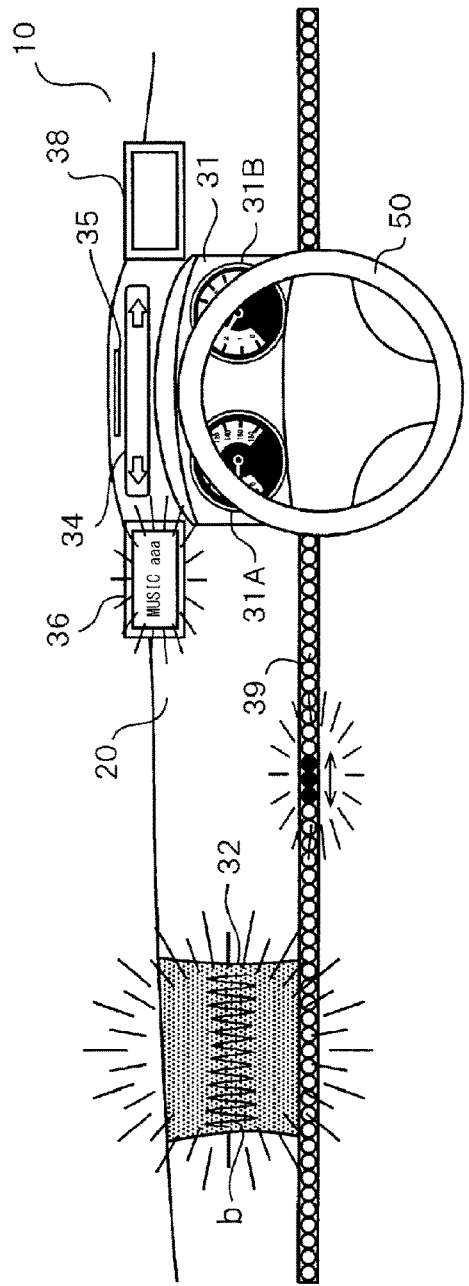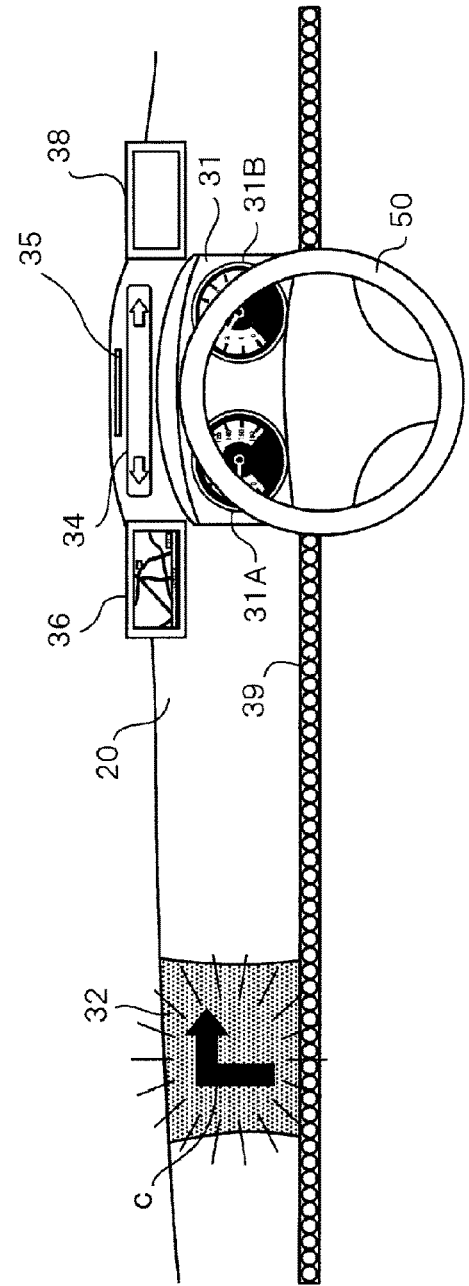

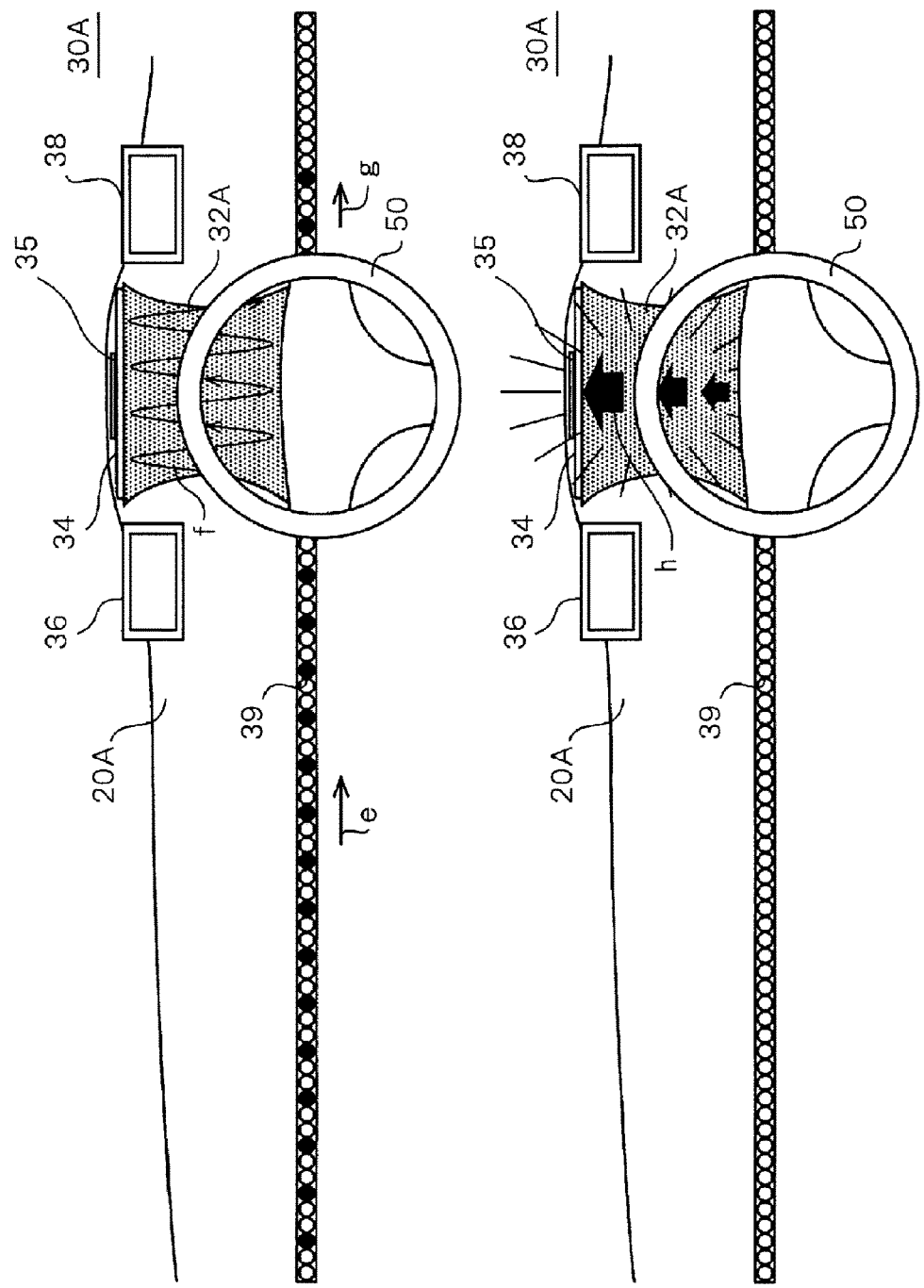

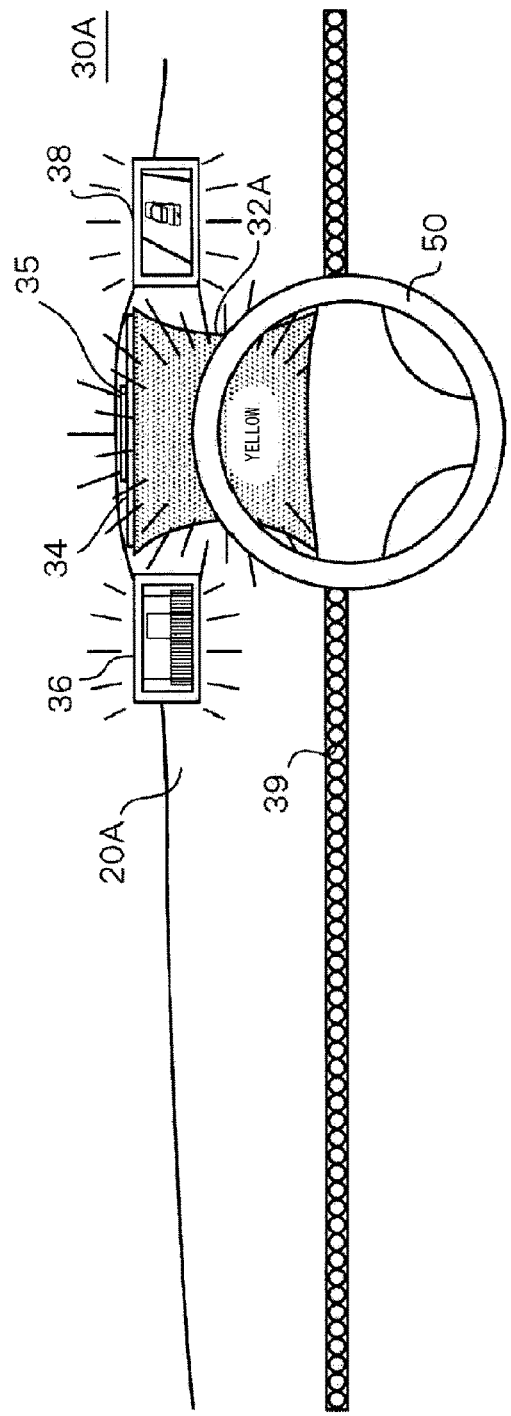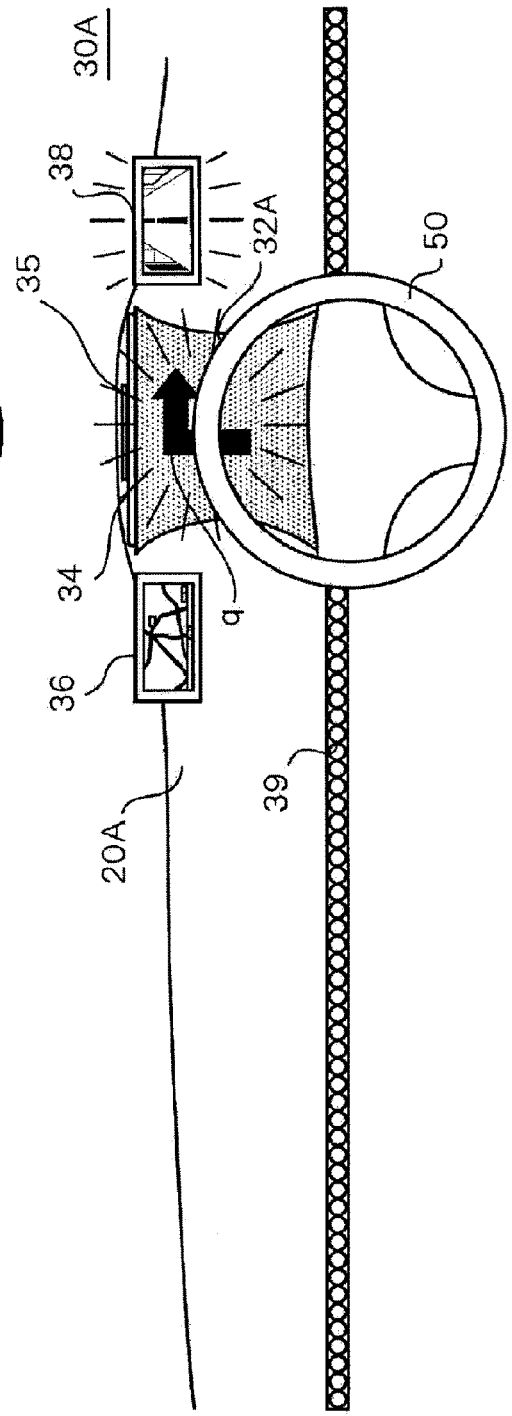

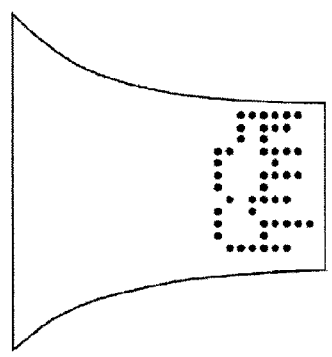
FIG. 12A
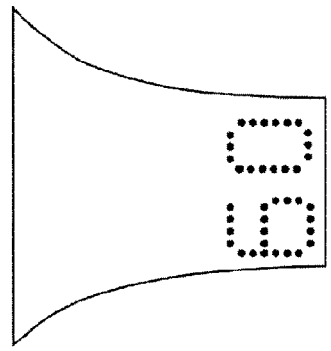
FIG. 12B
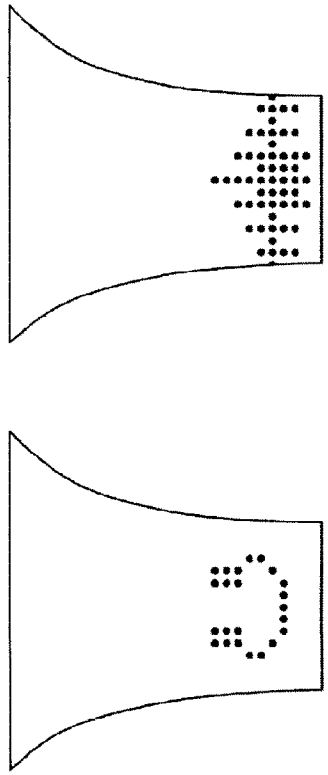
FIG. 12C
FIG. 12D
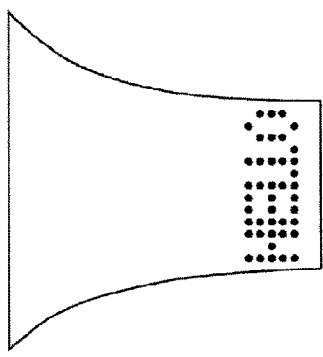
FIG. 12E
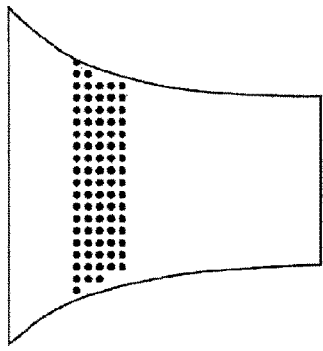
FIG. 12F
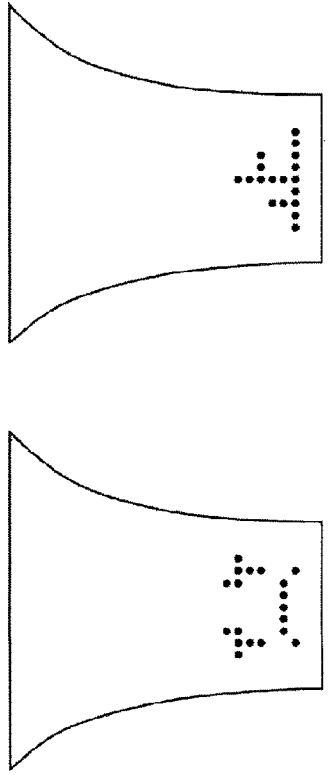
FIG. 12G
FIG. 12H

IN-VEHICLE DISPLAY APPARATUS AND INSTRUMENT PANEL

CROSS-REFERENCE TO RELATED APPLICATIONS

The present application claims priority from Japanese Patent Application Nos. 2014-186972 and 2014-186984 both filed on Sep. 12, 2014, the entire contents of which are incorporated herein by reference.

FIELD OF INVENTION

The present invention relates to an in-vehicle display apparatus and an instrument panel mounted on a vehicle.

RELATED ART

Normally, information such as driving assist information is displayed by a display device such as a display or a meter installed in the vehicle.

For example, a driving assist system is available in which a character appears on the display device installed in the cabin and various pieces of information are presented to the driver through the character (see Patent Document JP-A-2013-78969).

However, in this conventional driving assist system, on one display device disposed on the front surface of the instrument panel, as various pieces of information, music information is displayed, a navigation screen is displayed, and information on the Internet is displayed. That is, various pieces of information having different contents are displayed on the display device installed in one place in the cabin.

For this reason, information is not displayed in a position suitable for the role of the display, which makes the information hard to view and hard to understand for the driver and passengers.

On the other hand, when a plurality of display devices are disposed in the cabin, different pieces of information are displayed on the display devices. For this reason, it is difficult to see which piece of information is intended to be preferentially conveyed to the passengers. Consequently, it is difficult to call the driver's attention in assisting driving.

The present invention is made in view of the above-mentioned circumstances, and an object thereof is to provide an in-vehicle display apparatus and an instrument panel capable of displaying specific information in coordination in a position suitable for the role of the display and capable of making easy-to-understand information conveyed to the passengers.

SUMMARY

To attain the above-mentioned object, an in-vehicle display apparatus and an instrument panel according to the present invention is characterized by the following (1) to (10):

(1) An in-vehicle display apparatus that displays various pieces of information in a cabin, comprising:
 a first display device incorporated in a housing of an instrument panel; and
 a second display device disposed in a neighborhood of the instrument panel,
 wherein pieces of information displayed on the first display device and the second display device are displayed in coordination.

According to the in-vehicle display apparatus of the structure of the above (1), since the first display device installed on the instrument panel and the second display device disposed in the neighborhood of the instrument panel display specific information in coordination with each other, specific information can be displayed in coordination in a position suitable for the role of the display, so that information conveyed to the passengers can be made easy-to-understand. Moreover, since the information displayed by the first display device and the information displayed by the second display device are coordinated with each other, display with a sense of dynamism can be provided in the cabin.

(2) The in-vehicle display apparatus of the structure of the above (1), wherein the first display device is provided with a base material that displays an image along a surface of the housing and a surface panel that covers a surface of the base material and directs the image displayed by the base material toward a passenger seat side in the cabin.

According to the in-vehicle display apparatus of the structure of the above (2), since various pieces of information are displayed by the first display device incorporated in the surface of the housing of the instrument panel forming the inside of the cabin, the sense of unity of the displayed driving information and the vehicle can be felt. Consequently, the efficiency of information transmission to the passengers including the driver can be improved.

(3) The in-vehicle display apparatus of the structure of the above (1),
 wherein the first display device is incorporated in the housing of the instrument panel on a driver seat side.

According to the in-vehicle display apparatus of the structure of the above (3), since the first display device is installed on the instrument panel on the driver seat side where the second display device is disposed, a plurality of display devices can be closely disposed, which makes it easy for the driver to grasp the entire display.

(4) The in-vehicle display apparatus of the structure of the above (1),
 wherein the first display device is incorporated in the housing of the instrument panel on the passenger seat side.

According to the in-vehicle display apparatus of the structure of the above (4), since the first display device is installed on the instrument panel on the passenger seat side, it is also possible to display information directly necessary for driving and information not necessary for driving in such a manner as to be distinguished from each other by displaying information not directly related to driving such as entertainment information on the first display unit.

(5) An in-vehicle display apparatus that displays various pieces of information in a cabin, comprising:
 a first display device incorporated in a housing of an instrument panel; and
 a second display device disposed in a cabin,
 wherein pieces of information displayed on the first display device and the second display device are displayed in coordination.

According to the in-vehicle display apparatus of the structure of the above (5), since the first display device installed on the instrument panel and the second display device disposed in the cabin display information in coordination with each other, information can be displayed in coordination in a position suitable for the role of the display, so that information conveyed to the passengers can be made easy-to-understand. Moreover, the information displayed by the first display device and the information displayed by the second display device are coordinated with each other, display with a sense of dynamism can be provided in the cabin.

(6) An in-vehicle display apparatus that displays various pieces of information in a cabin, comprising:
  a first display device and a second display device incorporated in a housing of an instrument panel,
  wherein the first display device displays an image along a surface of the housing, and
  pieces of information displayed on the first display device and the second display device are displayed in coordination.

According to the in-vehicle display apparatus of the structure of the above (6), since the first display device and the second display device installed on the instrument panel display specific information in coordination with each other, specific information can be displayed in coordination in a position suitable for the role of the display, so that information conveyed to the passengers can be made easy-to-understand.

(7) The in-vehicle display apparatus of the structure of the above (6), wherein the first display device is provided with a base material that displays an image and a surface panel that covers a surface of the base material and directs the image displayed by the base material toward a passenger seat side in the cabin,
  wherein the surface panel forms part of the surface of the housing.

According to the in-vehicle display apparatus of the structure of the above (7), since various pieces of information are displayed by the first display device incorporated in the surface of the housing of the instrument panel forming the inside of the cabin, the sense of unity of the displayed driving information and the vehicle can be felt. Consequently, the efficiency of information transmission to the passengers including the driver can be improved.

(8) The in-vehicle display apparatus of the structure of the above (6),
  wherein the first display device is incorporated in the housing of the instrument panel on a driver seat side.

According to the in-vehicle display apparatus of the structure of the above (8), since the first display device is installed on the instrument panel on the driver seat side where the second display device is disposed, a plurality of display devices can be closely disposed, which makes it easy for the driver to grasp the entire display.

(9) The in-vehicle display apparatus of the structure of the above (6),
  wherein the first display device is incorporated in the housing of the instrument panel on the passenger seat side.

According to the in-vehicle display apparatus of the structure of the above (9), since the first display device is installed on the instrument panel on the passenger seat side, it is also possible to display information directly necessary for driving and information not necessary for driving in such a manner as to be distinguished from each other by displaying information not directly related to driving such as entertainment information on the first display unit.

(10) An instrument panel comprising the in-vehicle display apparatus according to the above (6).

According to the present invention, specific information can be displayed in coordination in a position suitable for the role of the display and the information conveyed to the passengers can be made easy-to-understand.

The present invention has been briefly described above. Further, details of the present invention will be further clarified by reading through the mode for carrying out the invention (hereinafter, referred to as "embodiment") described below with reference to the attached drawings.

BRIEF DESCRIPTION OF THE DRAWINGS

FIG. 6A is a view showing a display example when overspeeding occurs; FIG. 6B is a view showing a display example when a warning of the approach of a vehicle is provided;

FIG. 7A is a view showing a display example when music is played back; FIG. 7B is a view showing a display example when guidance is provided by a navigation device 58;

FIG. 10A is a view showing a display example when music is listened to by using entertainment information; FIG. 10B is a view showing a display example when overspeeding occurs;

FIG. 11A is a view showing a display example when the approach to the own vehicle is detected; FIG. 11B is a view showing a display example when guidance is provided by the navigation device 58; and FIG. 12A to FIG. 12H are views showing examples of symbols displayed by point light sources.

DETAILED DESCRIPTION

Hereinafter, an in-vehicle display apparatus according to the present embodiment will be described by using the drawings. The in-vehicle display apparatus of the present embodiment includes as a part of the instrument panel a display unit incorporated in the surface thereof.

First Embodiment

Figure 1:
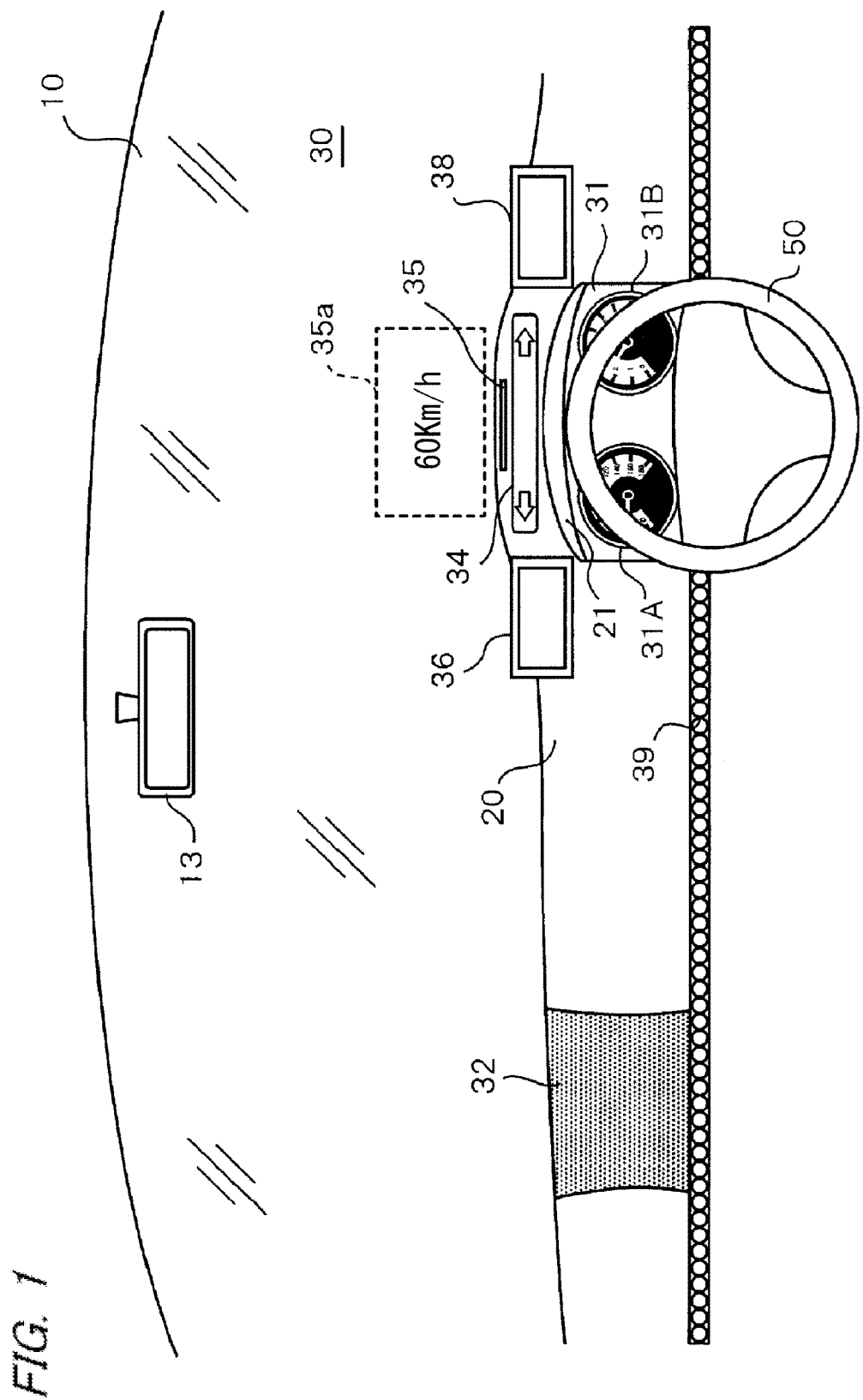
FIG. 1 is a front view showing the appearance of a neighborhood of an instrument panel 20 incorporating a display unit 32 included in an in-vehicle display apparatus according to a first embodiment.

FIG. 1 is a front view showing the appearance of a neighborhood of an instrument panel 20 incorporating a display unit 32 included in the in-vehicle display apparatus according to a first embodiment.

In the cabin viewed from the driver seat side, a windshield 10, a front mirror 13, the instrument panel 20, various kinds of display devices 30, a steering wheel 50 and the like are disposed.

Of the various kinds of display devices 30, a meter display 31 is disposed on the central front surface of the instrument panel 20 closest to the steering wheel 50 and situated in a position easy-to-view for the driver. The meter display 31 displays a speedometer 31A, an engine speed meter 31B and the like. On the instrument panel 20, a meter hood 21 serving as the canopy over the meter display 31 is formed.

On both sides of the meter display 31, a pair of liquid crystal displays 36 and 38 are disposed. The liquid crystal displays 36 and 38 (the second display device) display various pieces of information such as driving information, danger notification information, navigation information and entertainment information.

Moreover, on the upper surface of the instrument panel 20, a high mount display 34 is disposed. The high mount display 34 displays, for example, an image of the direction indicator.

Moreover, on the upper surface of the instrument panel 20 close to the windshield 10, a head-up display 35 that performs projection toward the windshield 10 is disposed. The head-up display 35 projects speed information and the like onto an area 35a on the windshield 10 which area 35a is easy-to-view for the driver. In FIG. 1, information representative of a speed "60 km/h" is projected.

Below the meter display 31, a line illumination 39 extending in the horizontal direction is disposed. The line illumination 39 is formed of a plurality of LED light sources arranged in the horizontal direction, and lights, for example, in such a manner as to flow in the horizontal direction, which provides the driver with a novel impression.

On the other hand, on the front surface of the instrument panel 20 on the passenger seat side, the display unit 32 (the first display device) is incorporated. The display unit 32 is a display device extending along the surface of the instrument panel 20 from the passenger seat side front surface of the instrument panel 20 to a neighborhood of the front end portion of the windshield 10 and incorporated in such a manner as to be substantially flush with the housing surface of the instrument panel 20.

Figure 2:
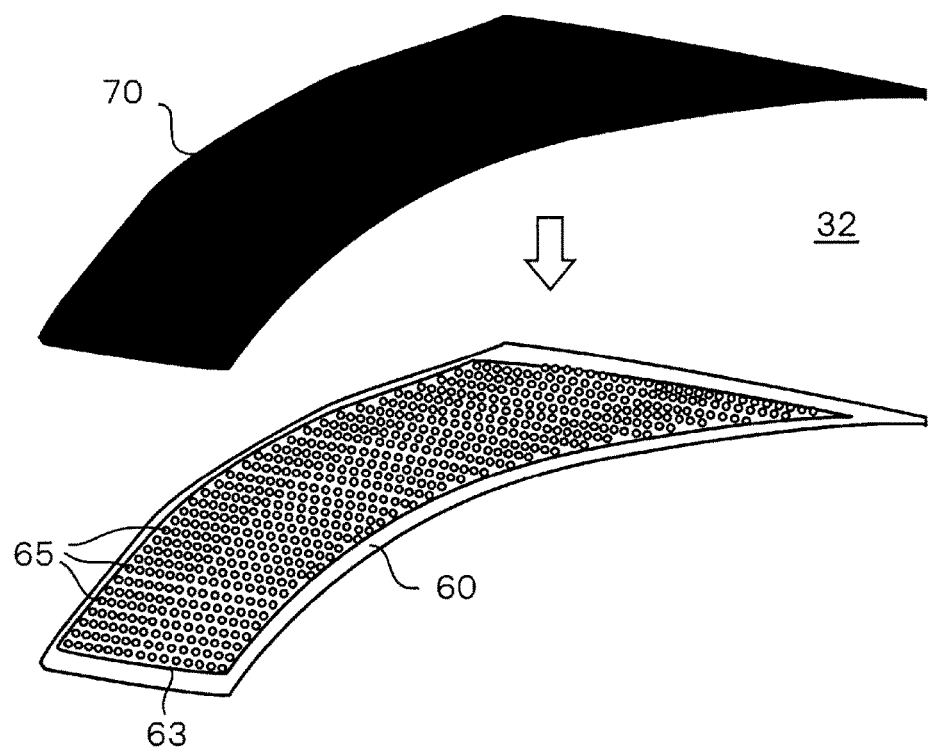
FIG. 2 is a perspective view showing the structure of the display unit 32.

FIG. 2 is a perspective view showing the structure of the display unit 32. The display unit 32 is a display device with a sense of depth extending from the front surface of the instrument panel 20 to the position close to the front end portion of the windshield 10 (a neighborhood of the front end portion), and has a structure where a surface panel 70 is superposed on an LED circuit body 60.

The LED circuit body 60 has a plurality of LED light sources (point light sources) 65 arranged in a staircase pattern on a mount base material 63, and is molded so as to fit the shape of the curved surface of the instrument panel. On the other hand, the surface panel 70 is curved so as to be superposed on the LED circuit body 60. This surface panel 70 forms a surface integral with the instrument panel 20. That is, the surface panel 70 is viewed as a part of the instrument panel by the passengers. On the surface of the surface panel 70, a plurality of pores 71 (see FIG. 3) corresponding to the LED light sources are formed as described later.

Figure 3:
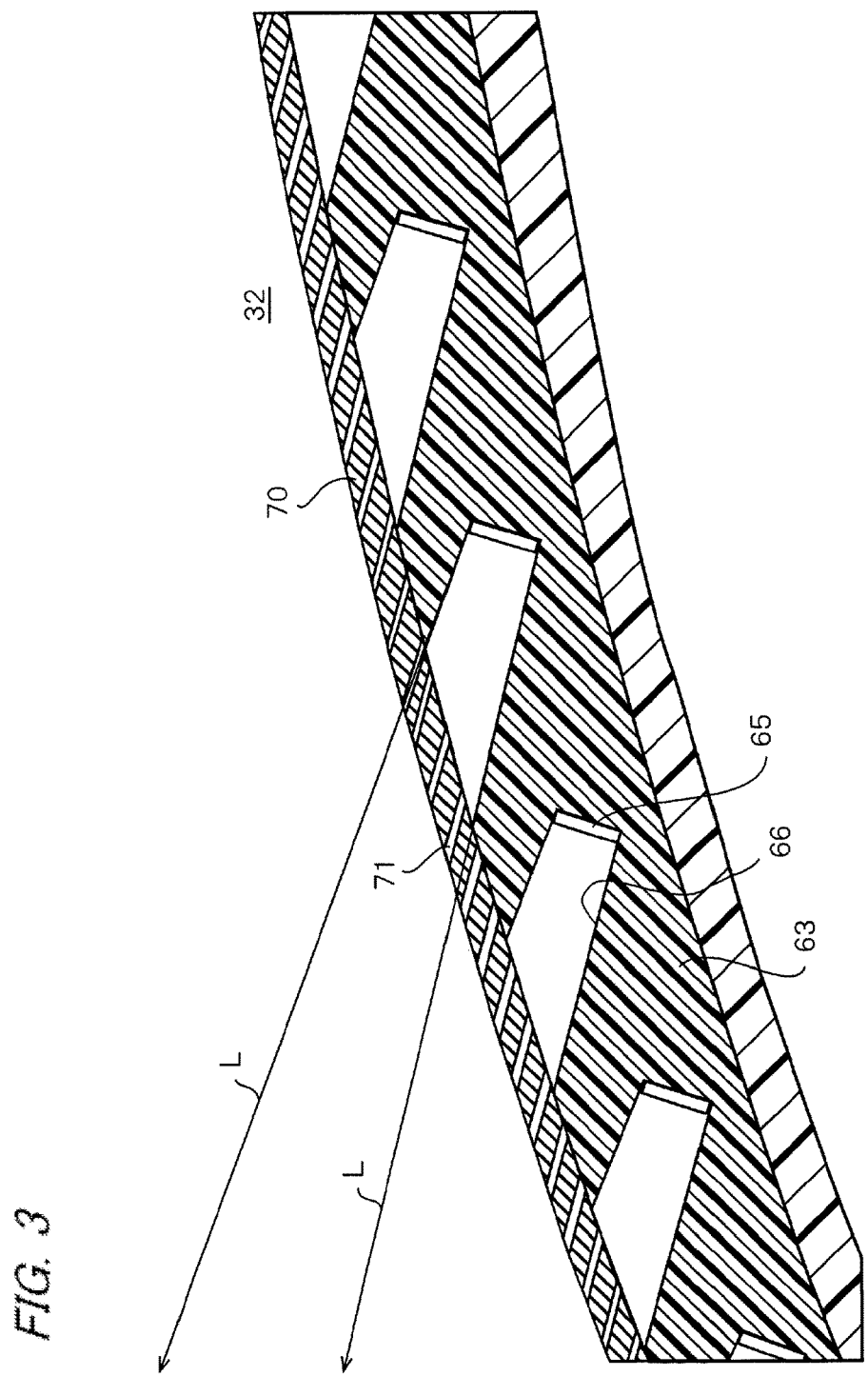
FIG. 3 is a partially enlarged cross-sectional view showing the structure of the display unit 32.

FIG. 3 is a partially enlarged cross-sectional view showing the structure of the display unit 32. On the surface of the mount base material 63, a multiplicity of hole portions 66 (step portions) are formed so as to be opened toward the passenger seat side. The LED light sources 65 are disposed on the bottom surfaces of the hole portions 66, respectively.

On the surface panel 70, the pores 71 are formed so that the light L of the LED light sources 65 emitted through the hole portions 66 is directed toward the passenger seat side. The number of pores 71 is approximately six to nine per LED light source 65. The pores 71 have a predetermined angle with respect to the direction of the thickness of the surface panel 70. The inclination angles of the pores 71 are smaller as they are closer to the passenger seat, and larger as they are closer to the windshield 10. In a place where the surface of the surface panel 70 is vertical or nearly vertical to the direction toward the passenger seat side, the inclination angles of the pores 71 may be 0 degrees.

The hole portions 66 are also inclined with respect to the direction of the thickness of the mount base material 63, and the inclination angles thereof are, similarly to those of the pores 71, smaller as they are closer to the passenger seat, and larger as they are closer to the windshield 10. The inner wall portions of the hole portions 66 also function as a member serving as a canopy that prevents the light L from the LED light sources 65 from being directed toward the windshield 10.

As described above, the inner wall portions of the hole portions 66 and the pores 71 of the surface panel 70 have a light directing function to direct the light emitted from the LED light sources 65 arranged on the mount base material 63 toward the passenger seat side in the cabin. The light directing function may be implemented by either one of the inner wall portions of the hole portions 66 and the pores 71 of the surface panel 70.

Figure 4:
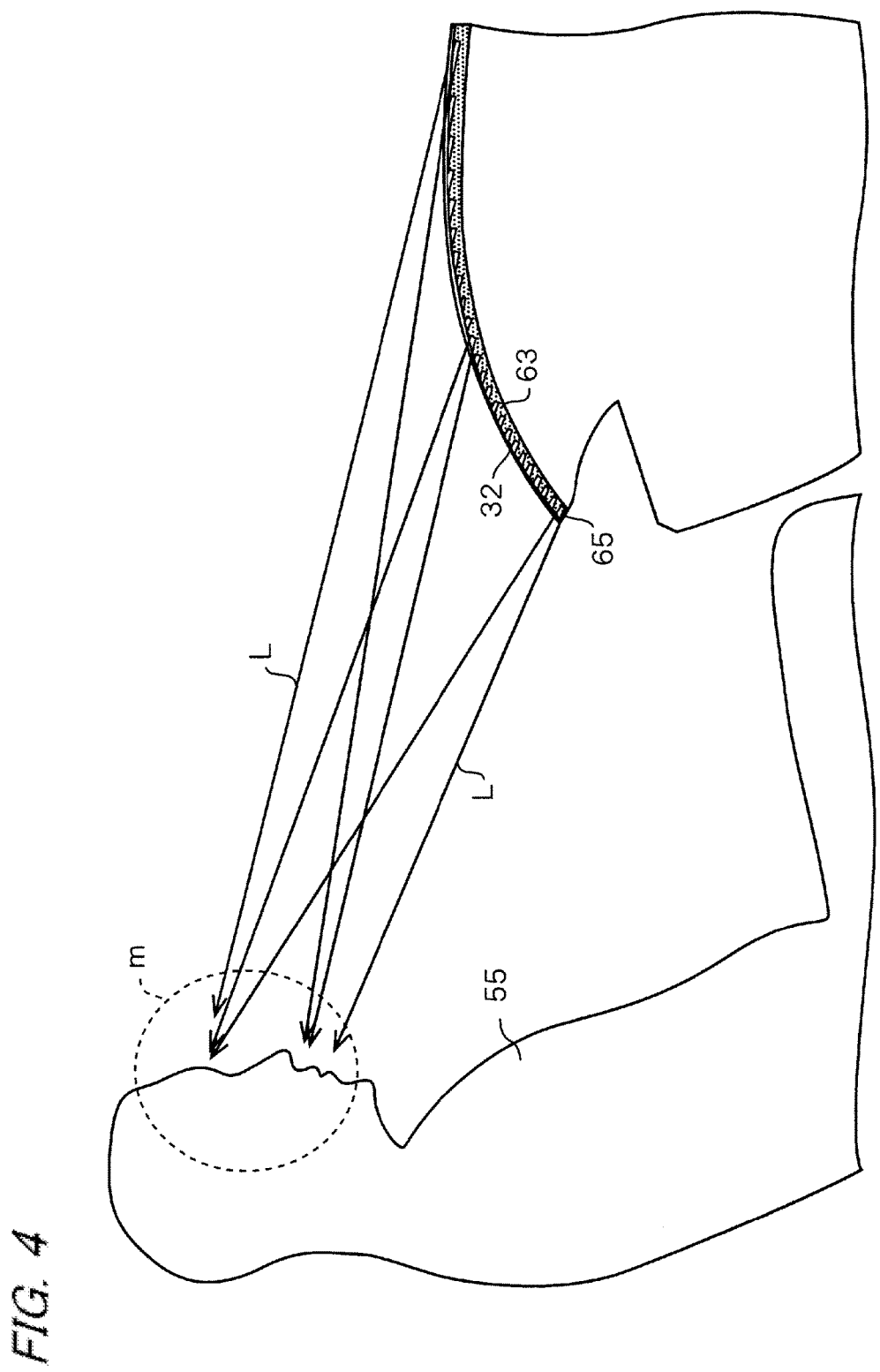
FIG. 4 is a view explaining the traveling direction of light L projected through a surface panel 70 from LED light sources 65 arranged on a mount base material 63.

FIG. 4 is a view explaining the traveling direction of the light L projected through the surface panel 70 from the LED light sources 65 arranged on the mount base material 63. As described previously, since the inclination angles of the pores 71 formed on the surface panel 70 gradually increase from the passenger seat side toward the front end portion of the windshield 10, the light L from all the LED light sources 65 arranged on the LED circuit body 60 is directed toward the face (see the dotted line frame m) of a passenger 55 seated on the passenger seat. Therefore, the passenger 55 can catch the light from all the LED light sources 65 without changing the direction of the line of sight.

On the display unit 32, since the LED light sources 65 disposed on the mount base material 63 are continuously arranged in lines from the passenger seat side to the front end portion of the windshield 10, when they are turned on, display with a sense of depth can be provided. When they are turned off, since the LED circuit body 60 situated inside the surface panel 70 of the display unit 32 is hidden by the pores 71 of the surface panel 70 and the inside of the surface panel 70 is darker than the surrounding areas as external light is difficult to enter the surface panel 70, it is difficult for the passengers to notice the presence of the LED circuit body 60.

Figure 5:
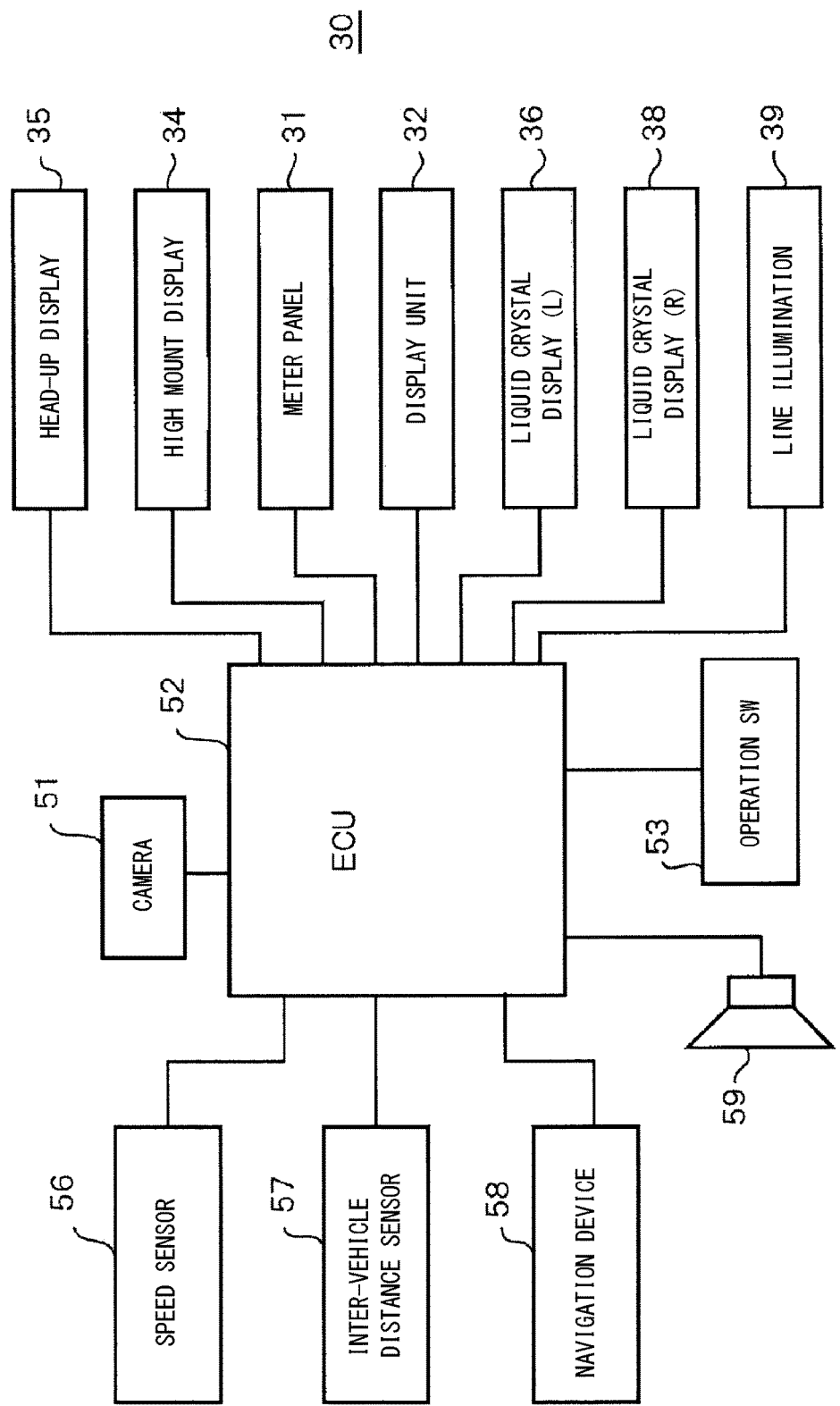
FIG. 5 is a view showing the hardware structure centering on a controller 52 that controls various kinds of display devices 30 arranged on the instrument panel 20 and its periphery.

FIG. 5 is a view showing the hardware structure centering on a controller 52 that controls the various kinds of display devices 30 arranged on the instrument panel 20. The controller 52 is formed of an ECU (Electronic Control Unit). To the controller 52, not only the above-mentioned various kinds of display devices 30 are connected but also a speed sensor 56, an inter-vehicle distance sensor 57, a navigation device 58, a speaker 59, an operation switch (SW) 53, a camera 51 and the like are connected.

The speed sensor 56 detects the speed of the vehicle. The inter-vehicle distance sensor 57 measures the distance from an object by transmitting and receiving infrared rays and detects the approach to the own vehicle. It may have a structure where the approach to the own vehicle is detected by analyzing an image taken by a camera. Moreover, the inter-vehicle distance sensor 57 may be provided more than one in number in order that the approach of an object to the own vehicle can be detected not only with respect to the front and the back of the vehicle but also with respect to the right and the left.

The navigation device 58 is provided with GPS (Global Positioning System) and map data, and has the function of guiding the own vehicle to a destination. In this example, the navigation screen is displayed on the liquid crystal display 36. The speaker 59 emits sound information such as driving information, warnings and music according to the sound data outputted from the controller 52.

The operation SW 53 is used for various switch inputs by the driver such as selection of entertainment information. The camera 51 is attached to a front part, a rear part, a left part, a right part and the like of the vehicle, and images the front, the back, the left, the right and the like of the vehicle to obtain images. The images taken by the camera 51 are used for the detection of an obstacle, the detection of the approach to the own vehicle and the like.

Next, a display operation by the controller 52 using the display unit 32 will be described. FIGS. 6A, 6B, 7A and 7B show display examples when a plurality of display devices are operated in coordination with one another. FIG. 6A shows a display example when overspeeding occurs. When the speed of the vehicle detected by the speed sensor 56 is higher than the legal speed or the like, the controller 52 lights the display unit 32 in red. In coordination with this display operation, the controller 52 blinks the speed of the vehicle projected by the head-up display 35 onto the area 35a of the windshield 10.

By thus providing display by two display devices of the display unit 32 and the head-up display 35 in coordination with each other, the driver easily notices the occurrence of overspeeding and becomes conscious that safe driving should be carried out.

Further, with an increase in the excess speed, the brightness of the light when the display unit 32 is lit may be increased, the light emission color may be changed, the blinking period of the speed image projected onto the windshield 10 may be increased, or the degree of the warning to the driver about the excess speed may be increased.

FIG. 6B shows a display example when a warning of the approach of a vehicle is provided. When the approach to the own vehicle detected by the inter-vehicle distance sensor 57 is not more than a predetermined distance so that the collision risk increases, on the display unit 32, the controller 52 moves an arrow mark a representative of the direction of the approach of the vehicle from the side of the windshield 10 in the direction of the front surface of the instrument panel 20. That is, display with perspective is provided in such a manner that the arrow mark a is approaching from afar. Further, with the movement of the arrow mark a, the controller 52 projects a message of the approach distance (here, 2 m) in the area 35a of the windshield 10 by the head-up display 35, and lights the line illumination 39 in such a manner as to flow.

By providing display by the three display devices in coordination with one another as described above, the passengers' attention can be turned to specific information (approach information). That is, the driver can immediately notice that he/she is in a dangerous situation, and the driver can be prompted to take action to avoid danger.

FIG. 7A shows a display example when music is played back. When the driver operates the operation SW 53 by using the entertainment information displayed on the liquid crystal display 36 and selects, for example, a piece of music (music aaa), the controller 52 plays back the music from the speaker 59, and at the same time, displays a waveform b that changes in accordance with the rhythm and tempo of the music being played back on the display unit 32. At this time, the controller 52 may control the line illumination 39 so as to move the lighting part in such a manner that it looks like the display is flowing in accordance with the rhythm and tempo of the music.

As described above, since the controller 52 not only displays music by the liquid crystal display 36 but also changes the display in such a manner that the display unit 32 dances to the music coming from the speaker 59 or changes the display in such a manner that the display unit 32 and the line illumination 39 dance, an atmosphere as if the driver were enjoying music at unity with the vehicle is created in the cabin, so that the passengers can enjoy the music more.

FIG. 7B shows a display example when guidance is provided by the navigation device 58. On the liquid crystal display 36, a navigation screen where the own vehicle mark is superimposed on map information is displayed. When receiving, for example, a signal indicating a right-hand turn from the navigation device 58, the controller 52 controls the lighting of the display unit 32, and displays a mark c formed by the lighting of the LED light sources 65 and representative of a right-hand turn. Thereby, the driver performs driving complying with the instruction from the navigation without overlooking the mark c representative of a right-hand turn which mark c is displayed large in size.

As described above, the display unit 32 of the first embodiment is incorporated in the housing surface of the instrument panel 20 on the passenger seat side. Moreover, the display unit 32 is provided with the mount base material 63 where a plurality of LED light sources 65 are arranged along the housing surface of the instrument panel 20 and the surface panel 70 provided in such a manner as to cover the surface of the mount base material 63 and directing the light emitted from the LED light sources 65 toward the passenger seat side in the cabin. Moreover, the inner wall portions of the hole portions 66 formed on the mount base material 63 also direct the light emitted from the LED light sources 65 toward the passenger seat side in the cabin. Therefore, the display unit 32 incorporated in the instrument panel 20 forming the inside of the cabin is capable of displaying various pieces of information to the passengers without the information being projected onto the windshield 10.

Moreover, the display unit 32 incorporated in the housing surface of the instrument panel 20 on the passenger seat side cooperates with another display device on the instrument panel 20 such as the liquid crystal display 36 or cooperates with another display device such as the line illumination 39 to change the display variously, and displays information such as driving information, danger notification information and entertainment information to the passengers. Thereby, on each display device, display suitable for the role thereof can be provided.

As described above, since various pieces of information are displayed by the display unit incorporated in the instrument panel forming the inside of the cabin, a sense of unity of the displayed driving information and the vehicle can be felt. As a result, it is expected that the efficiency of information transmission to the passengers including the driver improves. Consequently, the driver's interest level increases, and contribution to safe driving is expected.

Moreover, the display unit 32 incorporated in the surface of the instrument panel 20 on the passenger seat side is capable of changing its display variously together with other display devices such as the liquid crystal display 36 and the line illumination 39 and displaying information (specific information) such as driving information, danger notification information and entertainment information in coordination.

Consequently, specific information can be displayed in coordination in a position suitable for the role of the display and the information conveyed to the passengers can be made easy-to-understand. Further, since display is provided by this display unit and other display devices in coordination with one another, display with a sense of dynamism can be provided in the cabin.

Moreover, since the display unit is incorporated in the instrument panel on the passenger seat side, information not directly related to driving such as entertainment information is displayed on the display unit, so that it is also possible to display information directly necessary for driving and information not necessary for driving can be displayed in such a manner as to be distinguished from each other.

Moreover, by providing display by three or more display devices in coordination with one another, the passengers' attention can be turned to specific information more. For example, by displaying danger notification information on three or more display devices in coordination, the driver can immediately notice that he/she is in a dangerous situation, and the driver can be prompted to take action to avoid danger.

Moreover, since the display unit 32 extends from the front surface of the instrument panel to a neighborhood of the front end portion of the windshield, display with perspective can be provided to the passengers. Moreover, display that fades in or fades out may be added to display with perspective. Thereby, information can be transmitted as if to approach the passengers.

While a case where the display unit 32 displays various pieces of information in coordination with the liquid crystal display 36 and the line illumination 39 is used as an example in the description given above, the display unit 32 can present information in coordination with various other display devices in the cabin.

For example, an illumination installed on the ceiling or the pillar in the cabin and the display unit 32 may be coordinated with each other. Moreover, a structure may be adopted in which an illumination is installed on the floor of the vehicle and this illumination and display on the display unit 32 are coordinated with each other. Further, a structure may be adopted in which a display device is installed on the ceiling, the pillar or the floor in the cabin and this display device and the display unit 32 provide display in coordination with each other. These examples are adopted also in the following embodiment.

While a case where display is provided by the display unit and other display devices in coordination with one another is shown here, it is to be noted that display may be provided solely by the display unit.

Second Embodiment

While the display unit is incorporated in the instrument panel on the passenger seat side in the above-described first embodiment, in the second embodiment, a case is shown where the display unit is incorporated in the instrument panel on the driver seat side.

Figure 8:
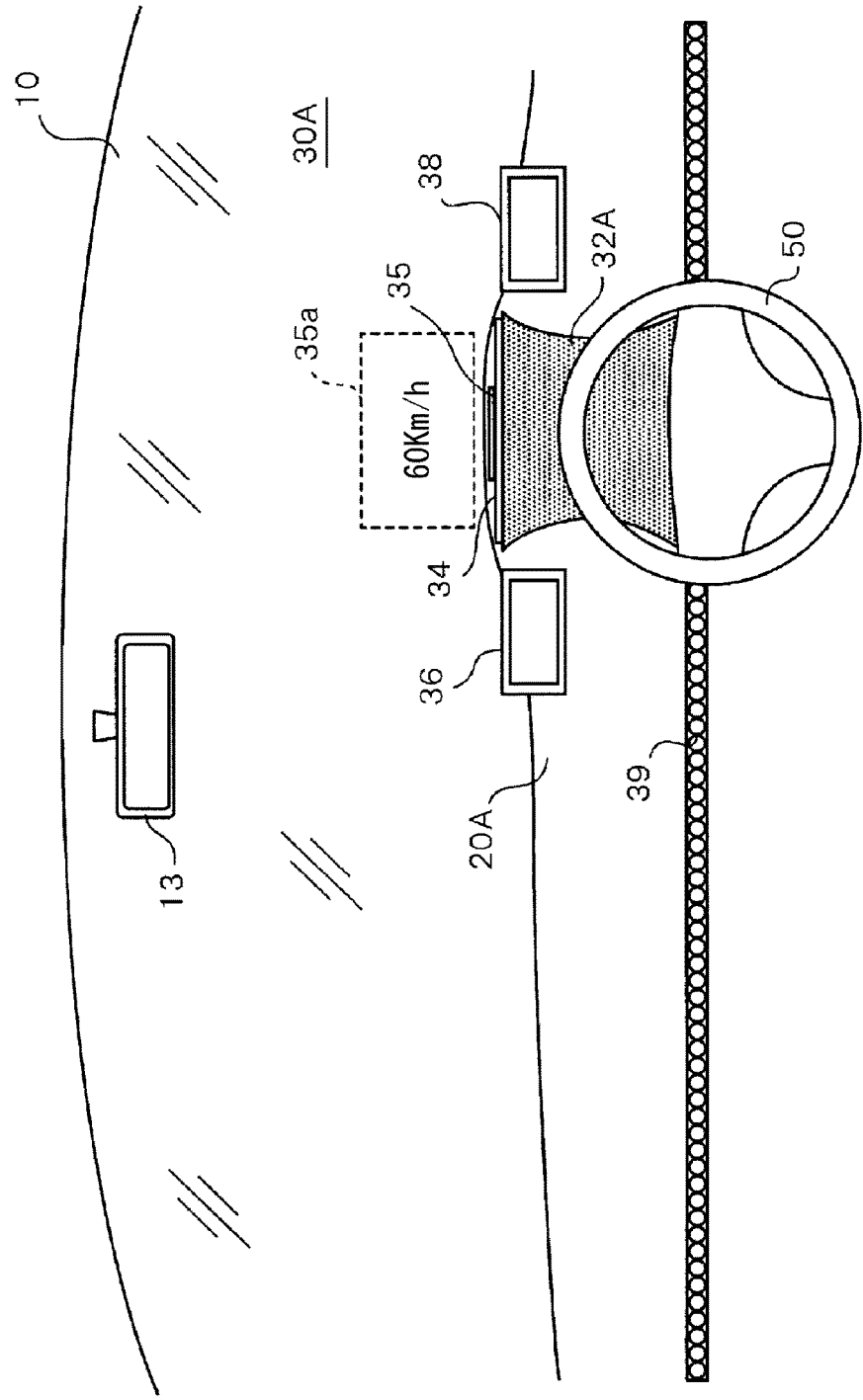
FIG. 8 is a front view showing the appearance of a neighborhood of an instrument panel 20A incorporating a display unit 32A included in an in-vehicle display apparatus according to the second embodiment.

FIG. 8 is a front view showing the appearance of a neighborhood of an instrument panel 20A incorporating a display unit 32A included in an in-vehicle display apparatus according to the second embodiment.

In the cabin viewed from the driver seat side, the windshield 10, the front mirror 13, the instrument panel 20A, various kinds of display devices 30A, the steering wheel 50 and the like are disposed.

Of the display devices 30A, the display unit 32A is integrated by being incorporated in the instrument panel 20A on the central front surface of the instrument panel 20A closest to the steering wheel 50 and situated in a position easy-to-view for the driver. Since the display unit 32A has the same structure as the display unit 32 of the first embodiment, a description thereof is omitted.

In the second embodiment, a display device is not specifically provided on the instrument panel 20A on the passenger seat side. When the display unit 32A extends to a position extremely close to the front end portion of the windshield 10, the high mount display 34 and the head-up display 35 may be omitted.

Figure 9:
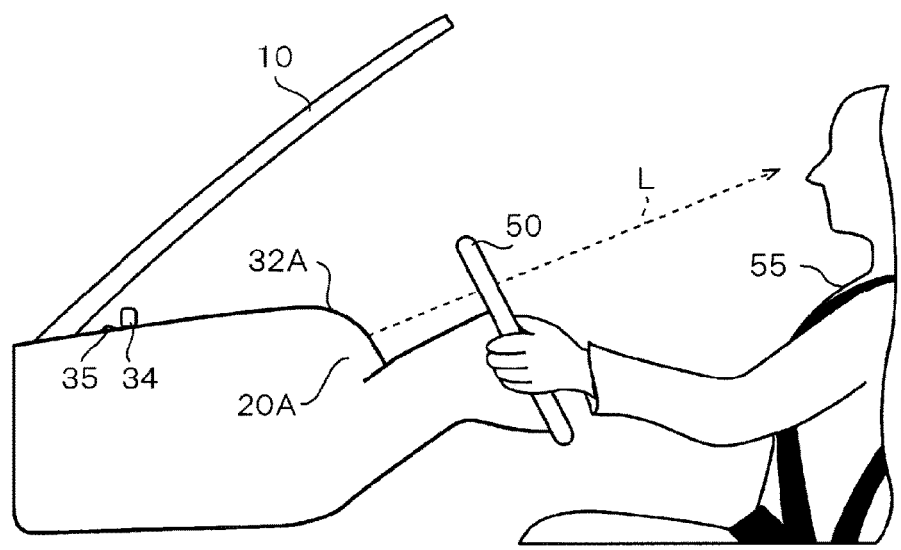
FIG. 9 is a view showing a neighborhood of the instrument panel 20A when the inside of the cabin on the driver seat side is viewed from a side.

FIG. 9 is a view showing a neighborhood of the instrument panel 20A when the inside of the cabin on the driver seat side is viewed from a side. Since the light L emitted from the display unit 32A is directed toward the driver's face as in the first embodiment, the driver can grasp the display contents of the display unit 32A without changing the orientation of the face.

Since the structures of the other display devices and the controller 52 are the same as those of the above-described first embodiment, elements the same as those of the first embodiment will not be described by using the same reference numerals and signs therefor.

FIGS. 10A and 10B show display examples when a plurality of display devices are operated in coordination with one another. FIG. 10A shows a display example when music is listened to by using entertainment information. The controller 52 causes the line illumination 39 and the display unit 32A to provide display in coordination with each other according to the rhythm and tempo of the music. For example, the controller 52 moves the lighting part of the line illumination 39 from the left rightward as shown by the arrow e in the figure, and switches the lighting from the line illumination 39 to the display unit 32A when the lighting part reaches the left end of the display unit 32A. Then, the controller 52 changes the lighting of the LED light sources 65 in such a manner as to undulate as shown by the arrow f in the figure on the display unit 32A, and again switches the lighting to the line illumination 39 when the lighting part reaches the right end of the display unit 32A. The controller 52 moves the lighting part of the line illumination 39 further rightward as shown by the arrow g in the figure. The controller 52 repeats this display operation while the music is being played.

Since the lighting part moves as if to dance on the display unit 32A in front as well as on the line illumination 39, the driver can listen to music with a sense of unity with the vehicle. Thereby, satisfaction is readily felt when music is enjoyed.

FIG. 10B shows a display example when overspeeding occurs. When overspeeding occurs, the controller 52 displays a mark h representative of the traveling of the vehicle on the display unit 32A, and moves it upward in the figure. Further, the controller 52 increases the forward movement speed of the mark h representative of the traveling of the vehicle displayed on the display unit 32A as the speed obtained by the speed sensor 56 increases. By this display with perspective, the driver easily notices that overspeeding has increased.

FIGS. 11A and 11B show other display examples when a plurality of display devices are operated in coordination with one another. FIG. 11A shows a display example when the approach to the own vehicle is detected. When detecting the approach to the own vehicle from images taken by the camera 51, the controller 52 lights the display unit 32A in yellow. Simultaneously with this display operation, the controller 52 displays the image of the left side taken by the camera 51 on the liquid crystal display 36 on the left side, and displays the image of the right side taken by the camera 51 on the liquid crystal display 38 on the right side.

When the display unit 32A is lit in yellow, by viewing the left and right liquid crystal displays 36 and 38, the driver can grasp the condition outside the vehicle in the horizontal direction without wagging his/her head and can avoid collision. Moreover, since the image of the left side is displayed on the liquid crystal display 36 on the left side and the image of the right side is displayed on the liquid crystal display 38 on the right side, images can be displayed in positions suitable for the role of the display, so that the directions of the taken images can be understood intuitively.

FIG. 11B shows a display example when guidance is provided by the navigation device 58. On the liquid crystal display 36, a navigation screen where the own vehicle mark is superimposed on map information is displayed. When receiving, for example, a signal indicating a right-hand turn from the navigation device 58, the controller 52 controls the lighting of the display unit 32A, and displays a mark q formed by the lighting of the LED light sources 65 and representative of a right-hand turn. Further, the controller 52 displays the image of the right-hand turn direction taken by the camera 51 on the liquid crystal display 38 on the right side.

Thereby, the driver performs driving complying with the instruction from the navigation without overlooking the mark q representative of a right-hand turn which mark q is displayed large in size. Further, since the image in the traveling direction is displayed on the liquid crystal display 38 when a right-hand turn is made, the image can be displayed in a position suitable for the role of the display, so that driving can be performed while the safety is confirmed more.

As described above, on the display unit 32A incorporated in the surface of the instrument panel 20A on the driver seat side, together with the other display devices such as the liquid crystal display 36 and the line illumination 39, display can also be variously changed and information (specific information) such as driving information, danger notification information and entertainment information can also be displayed in coordination. Moreover, by incorporating the display unit in the instrument panel on the driver seat side where the other display devices are disposed, a plurality of display devices can be closely disposed, which makes it easy for the driver to grasp the entire display.

Moreover, normal driving information may be conveyed to the driver by displaying it on the display unit 32A incorporated in the instrument panel 20A on the driver seat side. For example, information such as the direction indicator, the on/off of the headlights and the on/off of the air conditioner may be displayed on the display unit 32A.

Thereby, the sense of unity of the displayed driving information and the vehicle can be felt more. Consequently, it is expected that the efficiency of information transmission to the driver improves.

As still another example, as shown in FIGS. 12A to 12H, the display unit 32A can display various contents such as letters, pictures and symbols by a combination of light emitting point light sources, that is, by a dot pattern in coordination with the liquid crystal display 36 and the line illumination 39.

For example, as shown in FIG. 12A, when the vehicle is running smoothly or while bouncy music is being played back, the display unit 32 may display a smile mark. Conversely, as shown in FIG. 12E, in cases such as when the vehicle is running with poor fuel efficiency, a crying face mark or a troubled face mark may be displayed. In addition, the display unit 32 may display the symbol shown in FIG. 12B, the speed shown in FIG. 12C, weather information shown in FIG. 12D, a sign such as "STOP" shown in FIG. 12F, lines corresponding to the inter-vehicle distance shown in FIG. 12G and a message at the time of startup shown in FIG. 12H. Needless to say, this display may be provided by the display unit 32 according to the first embodiment.

The technical scope of the present invention is not limited to the above-described embodiment. The above-described embodiment may be modified or improved variously within the technical scope of the present invention.

For example, while in the above-described embodiment, the display unit incorporated in the instrument panel is formed by arranging a plurality of LED light sources on the rounded mount base material from the front surface of the instrument panel to the neighborhood of the front end portion of the windshield and covering the upper surface thereof with the surface panel, it may be formed by previously mounting the LEDs on a printed board formed so as to round from the front surface of the instrument panel to the neighborhood of the front end portion of the windshield and covering the upper surface of this printed board with the surface panel. As this printed board, for example, a PCB (Printed Circuit Board) is used.

Moreover, while LED light sources are cited as the light sources used for the display unit 32 in the above-described embodiment, a device that displays an image all over such as organic EL may be adopted as the display unit. Further, a dot pattern may be displayed on organic EL so that the organic EL functions as point light sources.

Further, the display unit 32 may display an image by using a TFT (Thin Film Transistor). In this case, for example, the mount base material 63 of the LED circuit body 60 is formed in a stepped form and a TFT is disposed on each step.

Moreover, while the display unit is incorporated only in the instrument panel on either one of the driver seat side and the passenger seat side in the above-described embodiment, it may be incorporated in both the driver seat side and the passenger seat side.

Moreover, while pieces of information displayed on three display devices are coordinated with one another in the above-described embodiment, pieces of information displayed on four or more display devices may be coordinated with one another.

What is claimed is:

1. An in-vehicle display apparatus configured to display various pieces of information in a cabin of a vehicle, the in-vehicle display apparatus comprising:
   a first display device incorporated in a housing of an instrument panel; and
   a second display device disposed in a neighborhood of the instrument panel, wherein
   the first display device and the second display device are configured to simultaneously and respectively display ones of images, comprising a first image and a second image, such that at least one of:
   a. in response to a detection that a speed of the vehicle increases over a speed limit, the first image comprises a numerical display of the speed of the vehicle and is blinked at differing frequencies as the second image changes any of color and brightness,
   b. as another vehicle approaches the vehicle from a direction, the first image displays an arrow moving in the direction as the second image displays a text message of a distance between the another vehicle and the vehicle,
c. as the vehicle plays a music track, the first image displays a title of the music track as the second image displays waveforms changing with a rhythm and tempo of the music track, and
d. as a navigation device displays guidance information, the first image displays an icon of the vehicle on a map and the second image displays a direction indicated by the guidance information, wherein the first display device is curved and molded to a curved surface of the instrument panel, wherein the first display device comprises a plurality of light emitting diodes (LEDs) and corresponding pores through which light from respective ones of the LEDs passes, and wherein inclination angles of the pores, with respect to a curved substrate of the first display device, increases in a direction from a passenger seat to a windshield of the vehicle comprising the instrument panel such that light is directed from the LEDs away from the windshield while at least a portion of the first display device faces the windshield.

2. The in-vehicle display apparatus according to claim 1, wherein the first display device is provided with a base material that displays at least one of the images along a surface of the housing and a surface panel that covers a surface of the base material and directs the at least one of the images displayed by the base material toward the passenger seat side in the cabin.

3. The in-vehicle display apparatus according to claim 1, wherein the first display device is incorporated in the housing of the instrument panel on a driver seat side.

4. The in-vehicle display apparatus according to claim 1, wherein the first display device is incorporated in the housing of the instrument panel on the passenger seat side.

5. The in-vehicle display apparatus according to claim 1, wherein a first of the images is displayed by the first display device and is a color increasing in brightness as a speed of the vehicle comprising the instrument panel increases, and
a second of the images is displayed by the second display device and is a blinking, numerical indication of the speed of the vehicle and is projected onto the windshield.

6. The in-vehicle display apparatus according to claim 1, further comprising:
a third display device comprising a string of LEDs aligned along a longitudinal length of instrument panel, wherein
the second display device projects a heads-up display of at least one of the images onto the windshield.

7. The in-vehicle display apparatus according to claim 6, wherein
a first of the images is displayed by the first display device and represents a direction in which an external vehicle is approaching the vehicle,
a second of the images is displayed by the second display device as a projection onto the windshield and is a numerical indication of a distance between the external vehicle and the vehicle, and
a third of the images is displayed by the third display device as a marker proportionally cascading towards a steering wheel of the vehicle as the external vehicle approaches the vehicle.

8. The in-vehicle display apparatus according to claim 1, wherein
a first of the images is displayed by the first display device and represents a waveform of a second music track played by the vehicle,
a second of the images is displayed by the second display device as information of a title of the second music track,
a third of the images is displayed by a third display device as a marker cascading towards and away from a steering wheel of the vehicle as the music plays, and
the third display device comprises a string of LEDs aligned along a longitudinal length of instrument panel.

9. The in-vehicle display apparatus according to claim 1, wherein the first display device and the second display device are physically separated displays and the second display device is disposed outside of the instrument panel.

10. The in-vehicle display apparatus according to claim 1, wherein the second image comprises a heads-up-display projected onto the windshield of the vehicle.

11. The in-vehicle display apparatus according to claim 1, wherein the first image, comprising the numerical display of the speed of the vehicle and blinked at the differing frequencies, is displayed at an area outside of a speedometer of the vehicle,
the speed limit, at which the speed of the vehicle is detected as being over, is a legal speed limit of an area in which the vehicle is located, and
in response to the detection that the speed of the vehicle increases over the speed limit, the numerical display of the speed of the vehicle alone is blinked at the differing frequencies.

12. An in-vehicle display apparatus configured to display various pieces of information in a cabin of a vehicle, the in-vehicle display apparatus comprising:
a first display device incorporated in a housing of an instrument panel; and
a second display device disposed in the cabin,
wherein the first display device and the second display device are configured to simultaneously and respectively display ones of images, comprising a first image and a second image, such that at least one of:
a. in response to a detection that a speed of the vehicle increases over a speed limit, the first image comprises a numerical display of the speed of the vehicle and is blinked at differing frequencies as the second image changes any of color and brightness,
b. as another vehicle approaches the vehicle from a direction, the first image displays an arrow moving in the direction as the second image displays a text message of a distance between the another vehicle and the vehicle,
c. as the vehicle plays a music track, the first image displays a title of the music track as the second image displays waveforms changing with a rhythm and tempo of the music track, and
d. as a navigation device displays guidance information, the first image displays an icon of the vehicle on a map and the second image displays a direction indicated by the guidance information, wherein the first display device is curved and molded to a curved surface of the instrument panel, wherein the first display device comprises a plurality of light emitting diodes (LEDs) and corresponding pores through which light from respective ones of the LEDs passes, and wherein inclination angles of the pores, with respect to a curved substrate of the first display device, increases in a direction from a passenger seat to a windshield of the vehicle comprising the instrument panel such that light is directed from the LEDs away from the windshield while at least a portion of the first display device faces the windshield.

13. An in-vehicle display apparatus configured to display various pieces of information in a cabin of a vehicle, the in-vehicle display apparatus comprising:
   a first display device and a second display device incorporated in a housing of an instrument panel, wherein the first display device and the second display device are configured to simultaneously and respectively display ones of a plurality of images, comprising a first image and a second image, such that at least one of:
   a. in response to a detection that a speed of the vehicle increases over a speed limit, the first image comprises a numerical display of the speed of the vehicle and is blinked at differing frequencies as the second image changes any of color and brightness,
   b. as another vehicle approaches the vehicle from a direction, the first image displays an arrow moving in the direction as the second image displays a text message of a distance between the another vehicle and the vehicle,
   c. as the vehicle plays a music track, the first image displays a title of the music track as the second image displays waveforms changing with a rhythm and tempo of the music track, and
   d. as a navigation device displays guidance information, the first image displays an icon of the vehicle on a map and the second image displays a direction indicated by the guidance information,
   wherein the first display device is curved and molded to a curved surface of the instrument panel,
   wherein the first display device comprises a plurality of light emitting diodes (LEDs) and corresponding pores through which light from respective ones of the LEDs passes, and
   wherein inclination angles of the pores, with respect to a curved substrate of the first display device, increases in a direction from a passenger seat to a windshield of the vehicle comprising the instrument panel such that light is directed from the LEDs away from the windshield while at least a portion of the first display device faces the windshield.

14. The in-vehicle display apparatus according to claim 13,
   wherein the first display device is provided with a base material that displays at least one of the plurality of images and a surface panel that covers a surface of the base material and directs the at least one of the plurality of images displayed by the base material toward the passenger seat side in the cabin,
   wherein the surface panel forms part of the surface of the housing.

15. The in-vehicle display apparatus according to claim 13,
   wherein the first display device is incorporated in the housing of the instrument panel on a driver seat side.

16. The in-vehicle display apparatus according to claim 13,
   wherein the first display device is incorporated in the housing of the instrument panel on the passenger seat side.

17. An instrument panel comprising the in-vehicle display apparatus according to claim 13.

18. An in-vehicle display apparatus configured to display various pieces of information in a cabin of a vehicle, the in-vehicle display apparatus comprising:
   a first display device incorporated in a housing of an instrument panel; and
   a second display device disposed in a neighborhood of the instrument panel,
      wherein the first display device and the second display device are configured to simultaneously and respectively display ones of images, comprising a first image and a second image, such that at least one of:
   a. as speed of the vehicle increases over a speed limit, the first image is blinked at differing frequencies as the second image changes any of color and brightness,
   b. as another vehicle approaches the vehicle from a direction, the first image displays an arrow moving in the direction as the second image displays a text message of a distance between the another vehicle and the vehicle,
   c. as the vehicle plays a music track, the first image displays a title of the music track as the second image displays waveforms changing with a rhythm and tempo of the music track, and
   d. as a navigation device displays guidance information, the first image displays an icon of the vehicle on a map and the second image displays a direction indicated by the guidance information,
   wherein the first display device is curved and molded to a curved surface of the instrument panel,
   wherein the first display device comprises a plurality of light emitting diodes (LEDs) and corresponding pores through which light from respective ones of the LEDs passes, and
   wherein inclination angles of the pores, with respect to a curved substrate of the first display device, increases in a direction from a passenger seat to a windshield of a vehicle comprising the instrument panel such that light is directed from the LEDs away from the windshield while at least a portion of the first display device faces the windshield.

* * * * *